(12) United States Patent
Lemoff et al.

(10) Patent No.: US 7,020,397 B2
(45) Date of Patent: Mar. 28, 2006

(54) OPTICAL RETIMING OF AN OPTICAL DATA SIGNAL

(76) Inventors: Brian E. Lemoff, 4844 Tammy Ct., Union City, CA (US) 94587; Ken A. Nishimura, 5351 Diana Common, Fremont, CA (US) 94555

( * ) Notice: Subject to any disclaimer, the term of this patent is extended or adjusted under 35 U.S.C. 154(b) by 669 days.

(21) Appl. No.: 10/035,528

(22) Filed: Oct. 23, 2001

(65) Prior Publication Data
US 2003/0076563 A1  Apr. 24, 2003

(51) Int. Cl.
*H04B 10/00* (2006.01)

(52) U.S. Cl. .................................. 398/154
(58) Field of Classification Search ........ 398/154–155, 398/175, 179
See application file for complete search history.

(56) References Cited

U.S. PATENT DOCUMENTS 4,900,115 A * 2/1990 Heuring et al. ............. 359/108
5,999,293 A * 12/1999 Manning .................... 398/52
6,396,607 B1 * 5/2002 Cao .......................... 398/154
6,636,318 B1 * 10/2003 Sarathy et al. .............. 356/450

* cited by examiner

*Primary Examiner*—Jason Chan
*Assistant Examiner*—Shi K. Li

(57) ABSTRACT

An optical retimer is provided that retimes an optical data signal entirely in the optical domain, thus eliminating the need for optical-to-electrical and electrical-to-optical converters, which are needed to perform retiming in the electrical domain. Eliminating these conversion steps also eliminates, or at least decreases, the potential for errors in the retimed optical signal, such as jitter. The optical retimer samples the optical data signal during a clock cycle that has been determined by clock recovery, allows the sampled signal to traverse an optical pathway for the remainder of the cycle, out-couples a fraction of the sampled optical signal each time the signal traverses the optical pathway, and amplifies the signal traversing the pathway to maintain the signal at the power level it had when it was sampled. By the end of the clock cycle, the out-coupled signal corresponds to a retimed version of the original signal, synchronized to the recovered clock signal.

23 Claims, 5 Drawing Sheets

OPTICAL RETIMING OF AN OPTICAL DATA SIGNAL

BACKGROUND OF THE INVENTION

The present invention relates to optically retiming an optical data signal, and an optical retimer for performing the retiming. One of the advantages of using the optical retimer of the present invention for performing retiming of an optical data signal is that it improves the integrity of the retimed optical signal relative to prior art techniques that convert the optical signal from the optical domain to the electrical domain, perform retiming in the electrical domain, and then re-convert the electrical signal to a retimed optical signal. In other words, the present invention eliminates, or at least decreases, the potential for errors (e.g., jitter) existing in the retimed optical signal. This is particularly important at high data rates, greater than a few billion bits per second, for example, where retiming in the electrical domain is severely limited by the speed of today's integrated circuit processes.

In optical fiber communications links, an optical source, typically a laser, is modulated between two optical power levels, the lower level indicating a logical 0, and the upper level indicating an optical 1. This optical source, e.g., the laser, is modulated at a specific, fixed bit rate to produce an optical data signal comprising logical 1s and 0s, which propagates along an optical fiber. As the optical data signal travels over a significant distance of the optical fiber, and passes through multiple optical-electrical-optical regeneration stages, the integrity of the optical data signal can degrade, thereby causing the "eye" to close. The "eye" corresponds to the integrity of the signal. The eye can be closed due to either loss of signal integrity in the horizontal direction caused by jitter in the rising and falling edges of the bit, or due to loss of integrity in the vertical direction as a result the signal losing its strength or noise in the signal.

In order to restore the integrity of a degrading signal, and "open the eye", an electronic retimer is used in the optical-electrical-optical regeneration stage. In an electrical retimer, the optical data signal is converted into an electrical data signal and an electrical clock signal that is synchronized to the data bit rate periodically causes the converted electrical data signal to be sampled over a small time window. This time window corresponds to a fraction of the corresponding bit period and is typically referred to as the "sampling aperture". The electrical retimer makes a decision of the logic level of the signal based on the average signal level within the sampling aperture, and then outputs a signal that is held at the determined logic level (i.e., 0 or 1) for an entire bit period. This removes the jitter from the signal and also regenerates the original square waveform, thereby increasing the signal integrity in both the vertical and the horizontal directions.

In order to use an electrical retimer in an optical data link, the optical signal must first be detected by a photodetector, converted from an optical signal to an electrical signal, retimed in the electrical domain and then reconverted back to an optical signal. One of the problems associated with performing retiming in this manner is that retiming in the electrical domain is typically performed by an integrated circuit (IC), and increases in the data bit rate (and the corresponding decreases in the sampling aperture) may present problems in producing an IC that can perform the retiming operations at the necessary speeds.

Accordingly, a need exists for an optical retimer that avoids the need for optical-to-electrical and electrical-to-optical conversion and that is capable of optically retiming an optical data signal to obtain a retimed optical data signal with high integrity.

SUMMARY OF THE PRESENT INVENTION

The present invention provides an optical retimer that retimes an optical data signal entirely in the optical domain, thus eliminating the need for optical-to-electrical and electrical-to-optical converters, which are needed to perform retiming in the electrical domain. The optical retimer samples the optical data signal during a clock cycle that has been determined by clock recovery, allows the sampled signal to traverse an optical pathway for the remainder of the cycle, out-couples a fraction of the sampled optical signal each time the signal traverses the optical pathway, and amplifies the signal traversing the pathway to maintain the signal at the power level it had when it was sampled. By the end of the clock cycle, the out-coupled signal corresponds to a retimed version of the original signal, synchronized to the recovered clock signal.

The apparatus of the present invention comprises an optical switch, an optical out-coupler and an amplifier. The switch is controlled to allow light corresponding to a current bit to enter an optical pathway of the retimer at a specific point in time derived from the recovered clock signal. Each time the sampled bit traverses the optical pathway, the optical out-coupler couples a fraction of the light corresponding to the current bit out of the retimer. An amplifier amplifies the light corresponding to the current bit each time the light propagates around the optical pathway to compensate for the light out-coupled by the out-coupler. By the end of the clock cycle, the out-coupled light corresponds to a retimed version of the optical data signal being retimed.

The present invention also provides a method for retiming an optical data signal. The method comprises the following steps. An optical data signal is sampled at a specific time and for a specific time duration during a clock cycle to obtain a current bit sample. The clock cycle corresponds to the rate at which the optical data signal is being transmitted. The light corresponding to the current bit sample is then propagated along an optical pathway of the retimer for a time period substantially equal to the clock cycle. Each time the light is traverses the optical pathway, a fraction of the current bit sample of the optical signal is coupled out of the retimer. The light corresponding to the current bit sample is amplified as it is propagated along the optical pathway to ensure that the propagating light is at a power level substantially equal to the power level of the sampled optical data signal. Once the light corresponding to the current bit sample has traversed the optical pathway a number of times corresponding to the clock cycle, the out-coupled light represents a retimed version of the sampled optical data signal. The light corresponding to the current bit sample is then dumped at the end of the clock cycle and a new bit sample is allowed to enter the retimer and traverse the pathway. The process is then repeated for the new bit sample.

One of the advantages of using the optical retimer of the present invention for performing retiming of an optical data signal is that it improves the integrity of the retimed optical signal relative to prior art techniques that convert the optical signal from the optical domain to the electrical domain, perform retiming in the electrical domain, and then re-convert the electrical signal to a retimed optical signal. By eliminating these steps and performing retiming totally in the optical domain, the present invention eliminates, or at least decreases, the potential for errors in the retimed optical signal, such as jitter. These and other features and advantages of the present invention will become apparent from the following description, drawings and claims.

DETAILED DESCRIPTION OF THE PRESENT INVENTION

Figure 1:
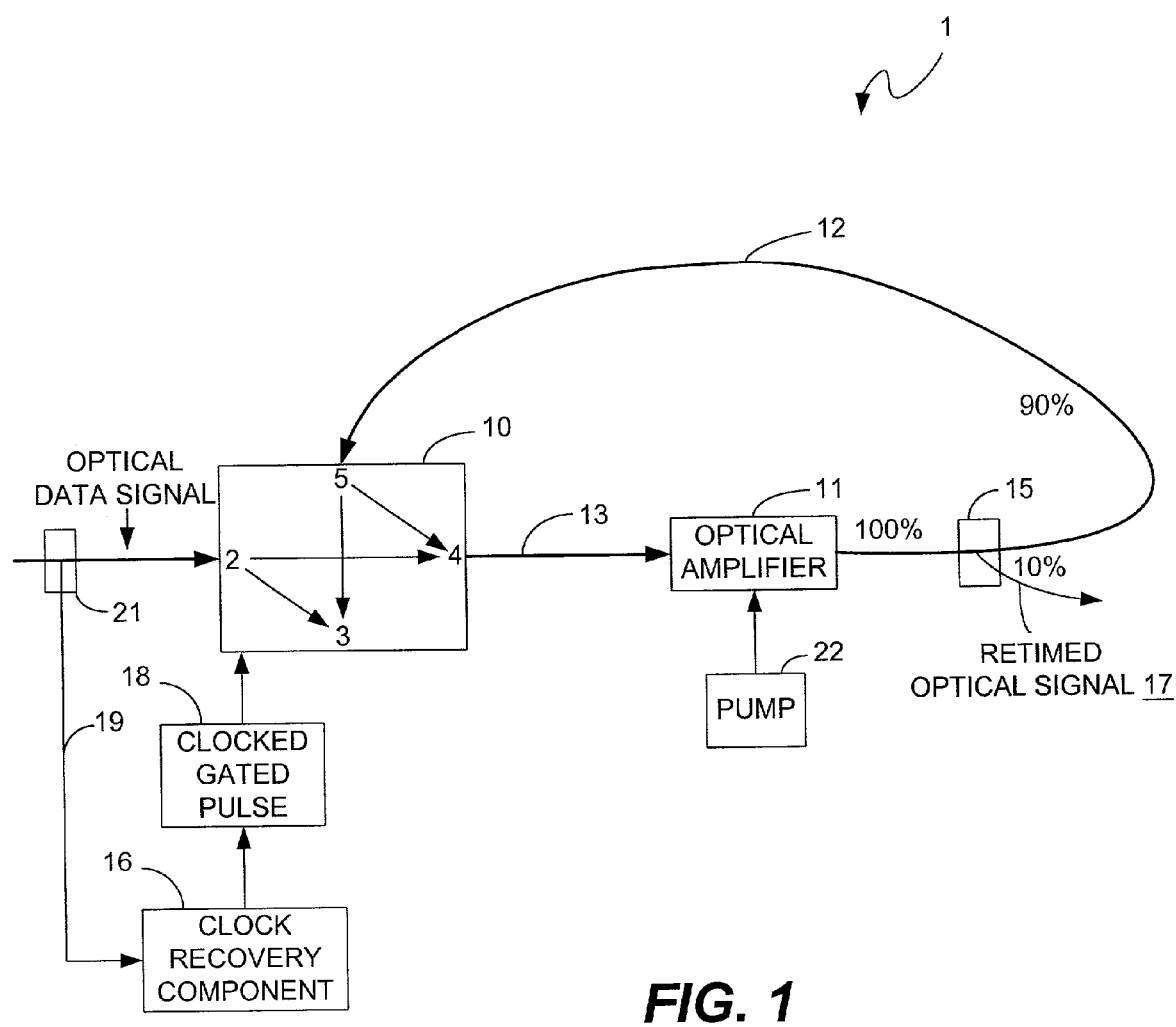
FIG. 1 is a block diagram that functionally illustrates the concepts of the optical retimer of the present invention.

FIG. 1 is a block diagram that illustrates an example embodiment of the optical retimer 1 of the present invention for optically retiming an optical data signal. The present invention comprises an optical switching device 10, which is shown in FIG. 1 for example purposes as a 2×2 optical crossbar switch. An optical amplifier 11, which is powered by a pump 22, provides the gain in the ring configuration, which is represented by the arrows 12 and 13 and by the light path through the switching device 10 and the optical amplifier 11. The circumference of the ring, in terms of the amount of time that is required for light to circumnavigate, the ring is equal to the sampling aperture. In other words, the amount of time that is required for light to propagate through the optical switching device 10, over the portion of the ring represented by arrow 13, through the optical amplifier 11, and around the portion of the ring represented by arrow 12, is equal to the sampling aperture. This pathway will be referred to hereinafter as simply "the ring".

The gain of the optical amplifier 11 is set such that it just compensates for the round trip loss incurred each time the light propagates around the ring. Each time the light propagates around the ring, a pre-selected percentage of the light, e.g., 10%, will be coupled out of the ring by an optical out-coupler, which is represented in FIG. 1 by an optical tap 15 and the arrow 17 diverging away from light path 12. This percentage of out-coupled light will remain constant over the entire bit period, and will be proportional to the input power during the sampled time aperture. Therefore, if 10% is out-coupled on each round trip of the sampled light, and the optical amplifier 11 compensates for the loss of this 10% of light during each round trip, then the retimed optical signal 17 that is output from the optical retimer 1 will have a power that is 1/10 of the power of the input signal during the sampling aperture. This will have the effect of producing an output data stream that matches the input data stream, but with all of the jitter removed and the original square waveform restored.

Figure 3:
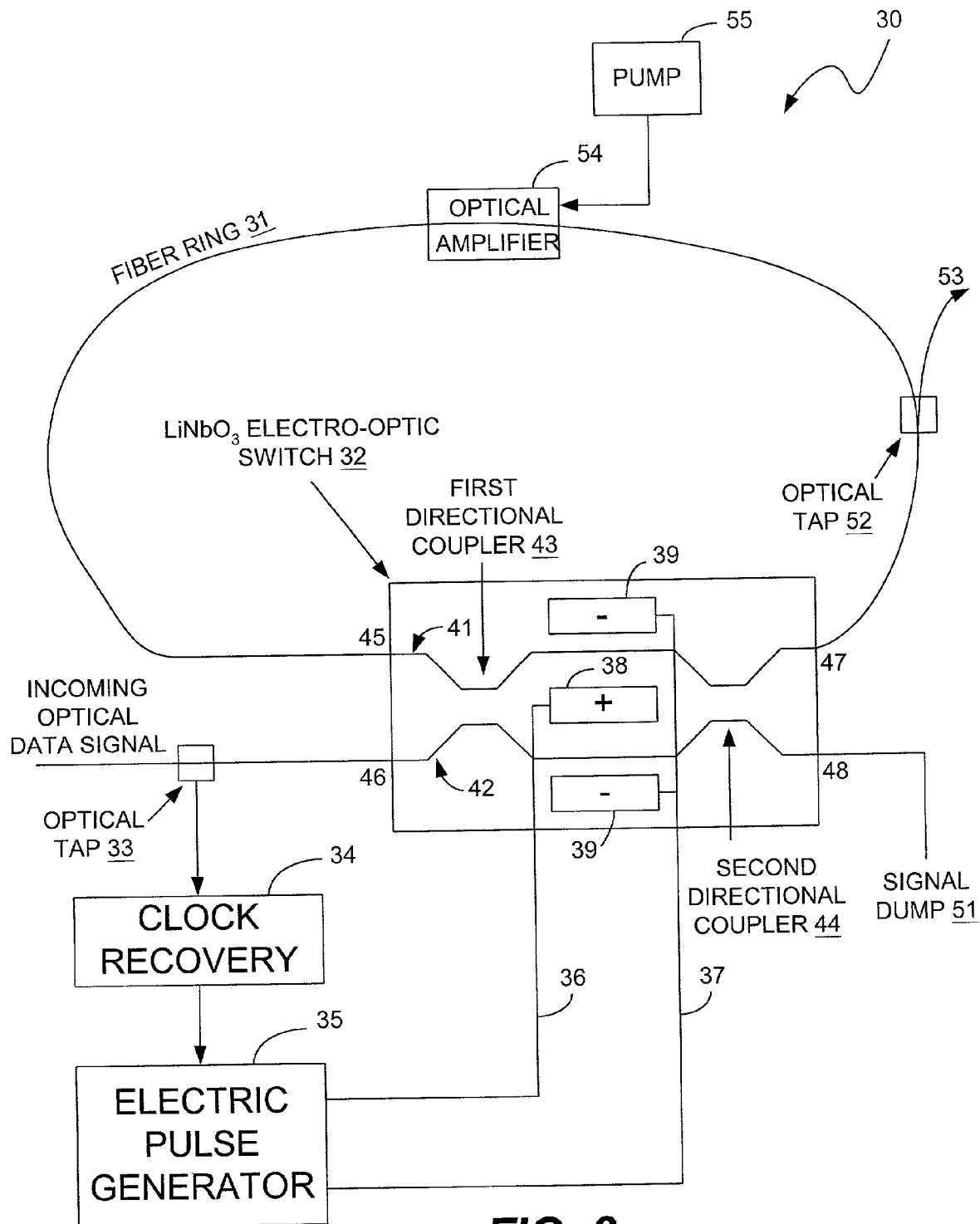
FIG. 3 is an example embodiment of one possible implementation of the optical retimer of the present invention in which the retimer comprises a Lithium Niobate switch and is implemented in a fiber-coupled environment.
Figure 4:
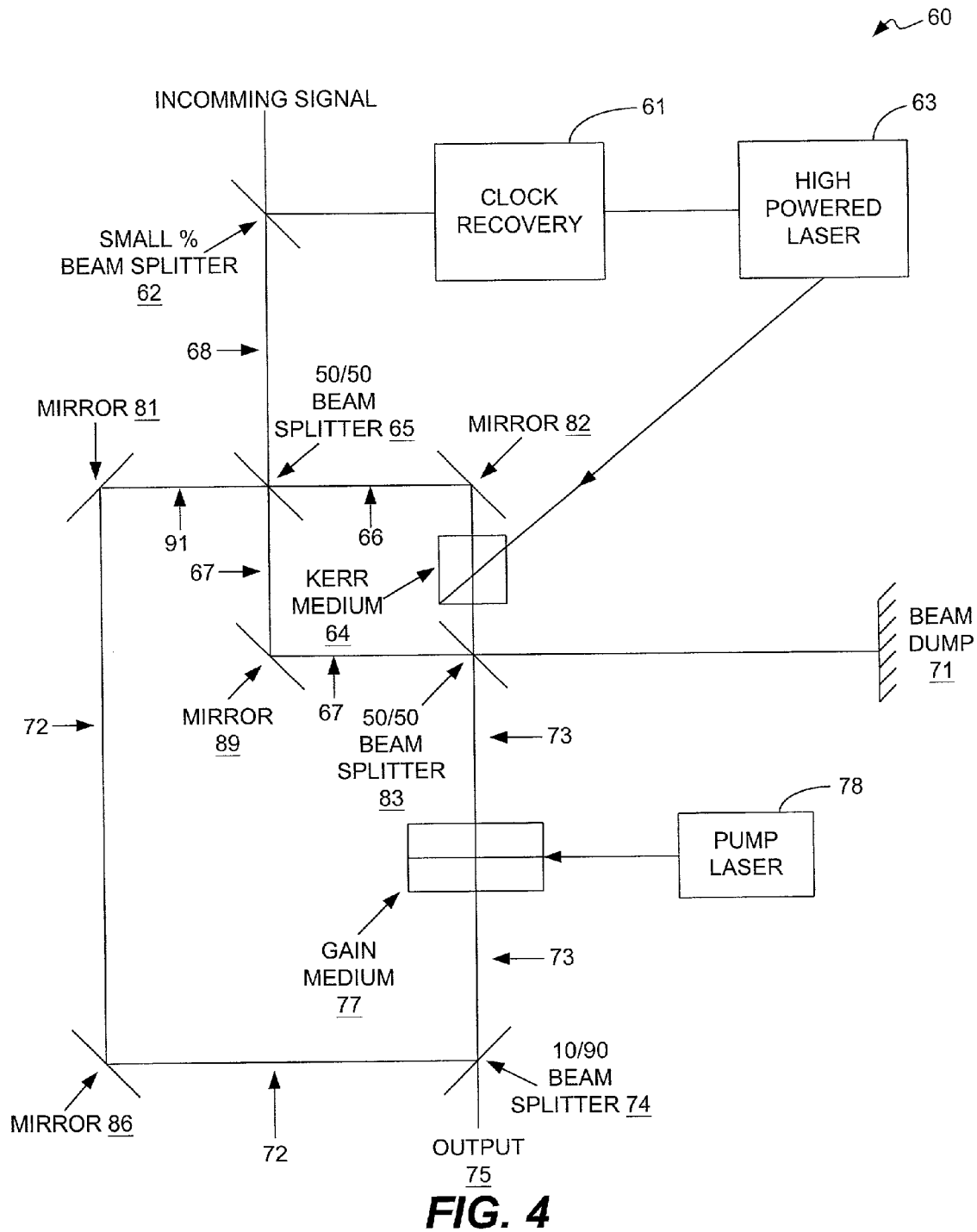
FIG. 4 is another example embodiment of another possible implementation of the optical retimer of the present invention in which the retimer utilizes free-space, bulk optic components to create the retimer.
Figure 5:
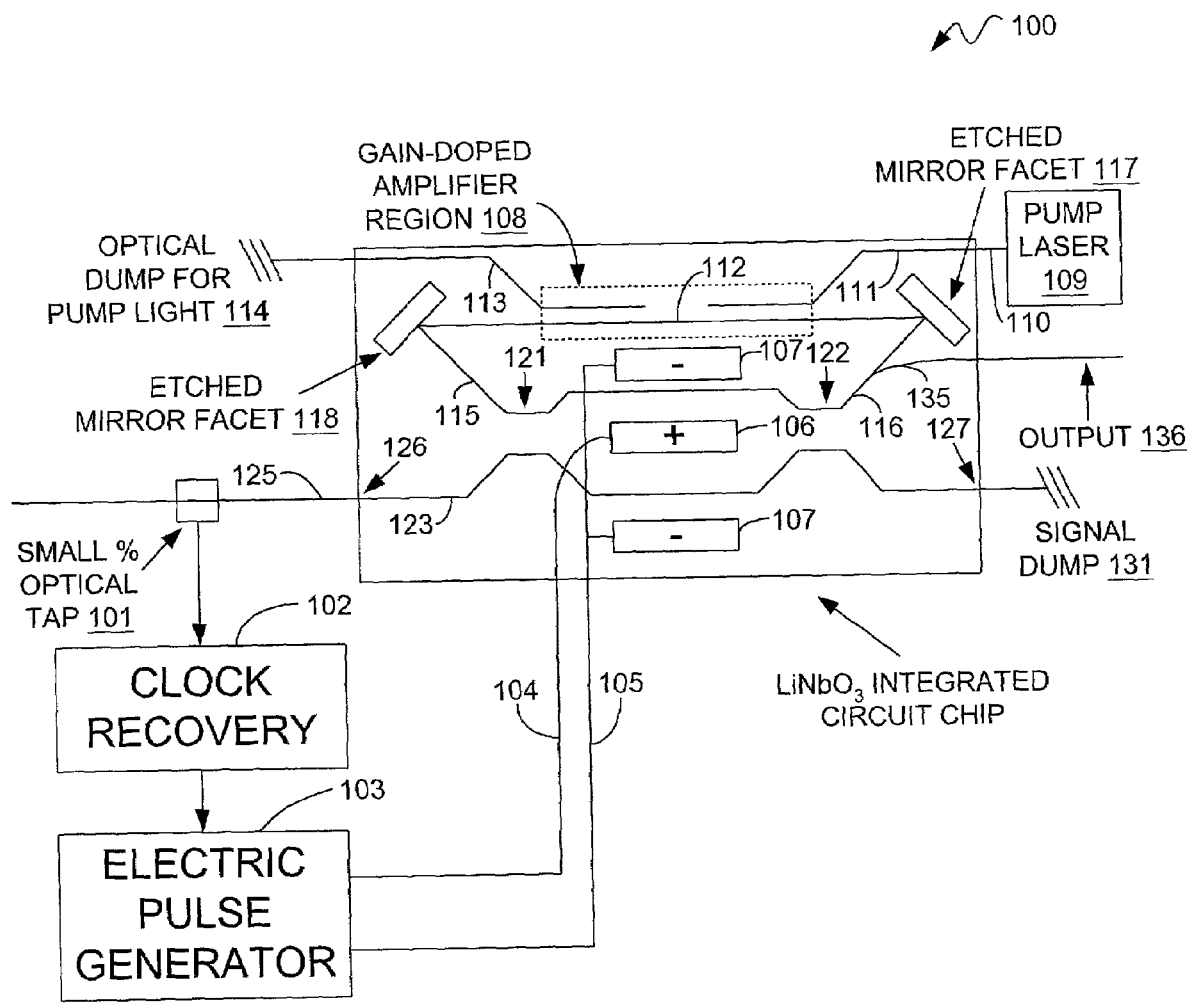
FIG. 5 is another example embodiment of the optical retimer in which all of the components of the retimer are integrated together on a Lithium Niobate planar lightwave circuit (PLC).

This optical amplifier 11 can be either electrically pumped with a DC current, as is the case with a semiconductor optical amplifier (SOA), or optically pumped with a laser beam, as is the case with an erbium-doped fiber amplifier (EDFA), to provide the necessary amplifying effect. The switching device 10 can be an electro-optic 2×2 optical crossbar switch that switches signals into and out of the ring. However, other types of switching devices and amplifiers may also be used to accomplish the goals of the present invention as described below in detail with reference to FIGS. 3–5. It should be noted that FIG. 1 is a functional diagram of the optical retimer of the present invention and can be implemented in a variety of ways, some examples of which are provided below with reference to FIGS. 3–5. Therefore, the description of FIG. 1 is primarily a description of the manner in which certain functions can be performed to enable optical retiming to be performed. The variety of manners in which this can be accomplished will become more clear from a description of FIGS. 3–5. The logic of FIGS. 3–5 is virtually identical to the logic of FIG. 1, but FIGS. 3–5 show different implementations for performing the logic of FIG. 1.

The switching device 10 of FIG. 1 operates as follows. In a first state, the crossbar optically connects port 2 with port 4 and port 3 with port 5. This causes the previous signal corresponding to the previous bit to be dumped at port 3 and the next bit to be sampled to enter the ring. In the second state, ports 2 and 3 are connected and ports 4 and 5 are connected. This enables the sampled portion of the current bit to propagate around the ring as a certain percentage of the signal is outcoupled at outcoupler 15 on each round trip for the duration of the bit period. A clocked gate pulse 18, which could be either electrical or optical, as described in more detail below, controls the state of the optical crossbar switching device 10.

The manner in which the optical retimer 1 operates over an entire bit period will now be described. At first, the crossbar is in a first state. When power from the previous bit is circulating about the ring, the early part of the new bit, which is incident on port 2, is being dumped to port 3. At some point in time, the gate pulse, which is shorter than the bit period, switches the crossbar to a second state, during which ports 2 and 4 are connected and ports 3 and 5 are connected. At this point, light from the new bit enters the ring through ports 2 and 4, while light from the old bit is being dumped through port 3 from port 5. Once this state has been maintained for a time longer than the optical round-trip time of the ring (i.e., the sampling aperture), all of the light in the ring is from the new bit. At this time, both the light entering the ring through ports 2 and 4 and the light being dumped through ports 3 and 5 correspond to the new bit. At the appropriate time, which depends on the selected sampling aperture, the gate pulse shuts off, and some sampled portion of the new bit is now trapped in the ring. As this light circles the ring, part of it is output through the out-coupler 15, as indicated by arrow 17. The gain of the amplifier is such that it just compensates for all of the round trip losses. Therefore, the signal that comes out through the out-coupler will be constant for the whole bit period, and will be proportional to the input power during the sampled time aperture. This will have the effect of producing an output data stream that matches the input stream, but with all of the jitter removed.

The pulse generator 18 generates a pulse that is synchronized to a clock that is at the bit frequency of the optical data signal, because the clock is recovered from the optical data signal. This assumes that clock recovery has already occurred and that the pulse has been synchronized to the clock rate of the optical data signal. Clock recovery and the manner in which it is performed is well known to those skilled in the art. The block 16 represents the clock recovery component. The line 19 leading from the optical data signal to the clock recovery component 16 represents sampling of the optical signal by the clock recovery component 16 to perform clock recovery. The pulse produced by the pulse generator 18 that controls the switch 10 is derived from the clock signal generated by the clock recovery component 16. The clock recovery component 16 will not be described in detail herein because such components are commonly used with electrical retimers and are well known in the art. The present invention is not limited to the configuration of the clock recovery component 16 or with respect to the manner in which clock recovery is performed.

For the duration of the pulse, the optical switch 10 connects ports 2 and 4, long enough in time to fill the ring with light from the input signal (i.e., the current bit). Simultaneously, the optical switch 10 also connects ports 3 and 5, allowing light from the previous bit to exit the ring. When the pulse ends, the original configuration of the optical switch 10 is restored, with ports 2 and 3 connected and ports 4 and 5 connected. In this configuration of the optical switch 10, the sampled light makes successive round trips through the ring. On each round trip, the partially transmitting out-coupler 15 allows some fraction of the light in the ring to couple to the output 17 of the retimer 1. On each round trip, the gain from the amplifier 11 is sufficient to compensate for the loss due to the output coupling and any other losses incurred during the round trip. This optical signal circulates in the ring (with partial out coupling) until the next pulse occurs, which causes the optical switch 10 to dump the sampled signal and allow a sample of the optical data signal corresponding to the next bit to enter the ring.

Figure 2:
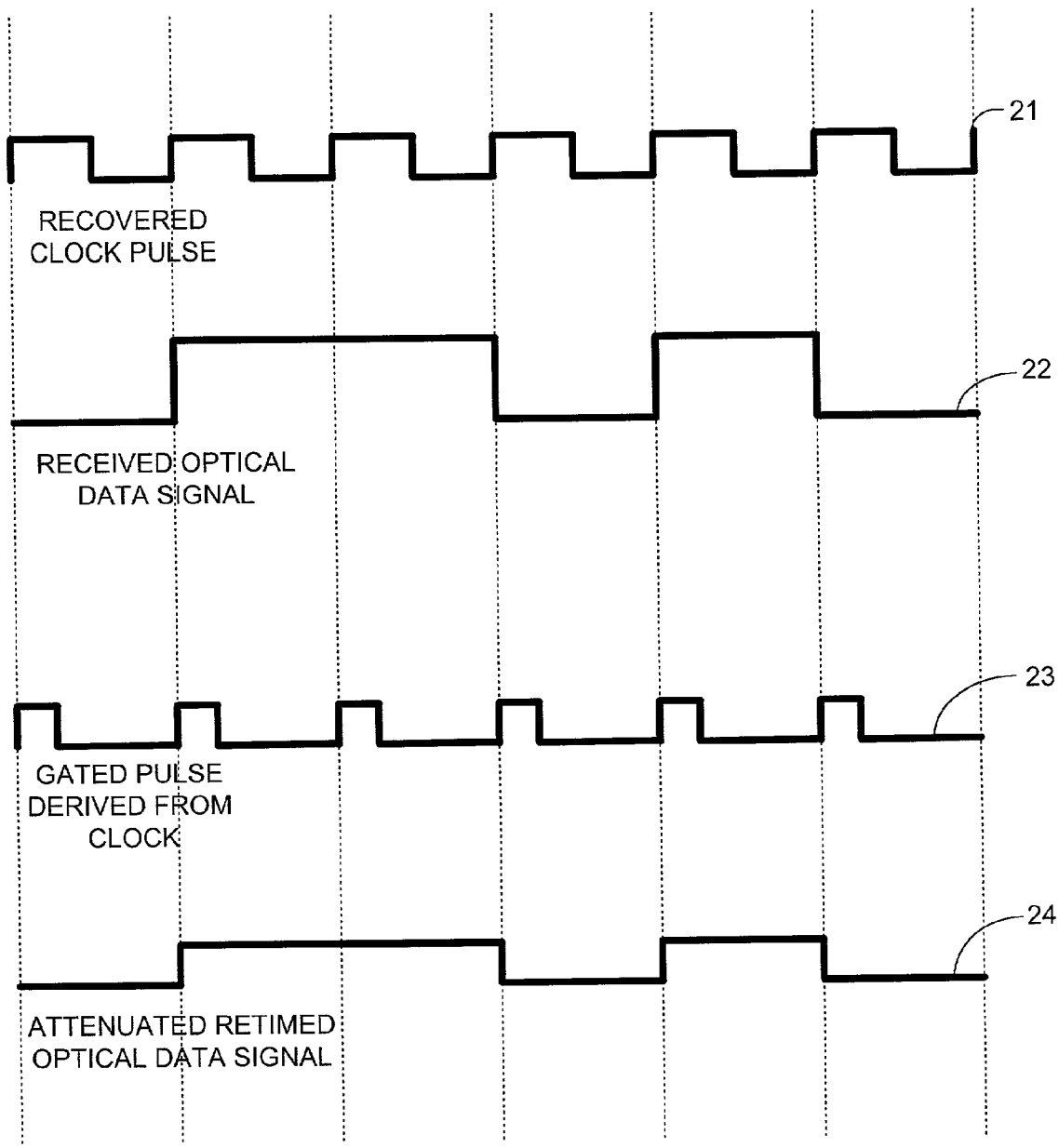
FIG. 2 is a timing diagram demonstrating the timing relationships between various events occurring during the optical retimer process of the present invention.

Essentially, the light that passes through the out-coupler 15 is an attenuated copy of the sampled signal, repeated over and over again, for the duration of the bit period (i.e., the recovered clock period). Then, the current bit is dumped from the ring, as the next bit is injected into the ring, as described above in detail. Thus, the attenuated copy of the input signal is retimed, with all jitter removed and with the original square waveform restored, and can then be optically amplified, if necessary, to an appropriate optical level. FIG. 2 is a timing diagram that demonstrates the manner in which optical retiming is performed in accordance with the present invention.

Waveform 21 represents the clock signal recovered by the clock recovery component 16 shown in FIG. 1. This recovered clock signal corresponds to the optical data rate. Waveform 22 represents an arbitrary optical data signal that has been degraded through jitter and distortion. For example purposes, it is assumed that the optical data signal 22 can only change near the rising edge of the clock signal 21. The difference in time between the rising edge of clock signal 21 and transitions in the optical data signal 22 is caused by jitter. The difference between the shape of optical data signal 22 and a square waveform can be due to many distortion-causing phenomena, such as dispersion and nonlinearities of optoelectronic components. Waveform 23 corresponds to the pulse generated by the pulse generator 18. This pulse is delayed with respect to the rising edge of the clock signal 21 by an appropriate fraction of a clock cycle in order to sample a central portion of each bit of optical data signal 22. As stated above, the pulse signal 23 causes the switching operations to be performed by the optical switch 10 shown in FIG. 1. The pulse is shorter than the clock cycle and is at least long enough to allow the light corresponding to the incoming bit to fill the ring and to allow the light corresponding to the outgoing bit to exit the ring.

As stated above, each time the light makes a round trip around the ring, a percentage of the light 17 is out-coupled at out-coupler 15. The light continues making round trips around the ring until the beginning of the next pulse signal, and each time around, the light is amplified to its previous level. At the beginning of the next pulse signal, the out-coupled optical signal 24 will correspond to a retimed, more square, attenuated version of the input optical signal 22, as shown in FIG. 2. Thus, the out-coupled optical signal 24 has been retimed in the optical domain. The retimed optical signal 24 can then be optically amplified, if necessary, to the appropriate power levels.

FIGS. 3–5 illustrate example embodiments for the optical retimer of the present invention. The embodiment shown in FIG. 3 utilizes a Lithium Niobate crystal to provide the necessary switching action. The embodiment shown in FIG. 4 utilizes bulk optical components to create the optical switching action. The embodiment shown in FIG. 5 provides a fully-integrated solution in which the optical retimer is integrated into a Lithium Niobate substrate. Each of these example embodiments will now be described in detail, beginning with the embodiment shown in FIG. 3.

The embodiment shown in FIG. 3 represents a fiber-coupled embodiment of the optical retimer 30 in which the ring comprises an optical fiber loop 31. The optical fiber ring 31 preferably has a large enough radius that no light is lost as light circulates around the loop. However, as will be understood by those skilled in the art, a loop having a smaller bend radius could be used, but then additional amplification of the optical signal may be needed. Therefore, preferably, the radius of the ring is large enough so that all of the light, except for the light that is intentionally tapped off, remains in the ring. The switching action is provided by a Lithium Niobate($LiNbO_3$) 2-by-2 Mach-Zehnder optical switch 32. The optical retimer 30 is logically identical to the optical retimer 1 of FIG. 1. An optical tap 33 samples the incoming optical signal and the clock recovery component 34 then recovers the bit rate from the incoming data signal. An electric pulse generator 35 derives pulses from the recovered clock signal and switches an electric field off and on via positive and negative electrodes 36 and 37, which are connected to positive and negative contacts 38 and 39 in the Lithium Niobate switch. The line beginning at port 5 and continuing through the Lithium Niobate substrate to port 4 represents a first waveguide 41. The line beginning at port 2 and continuing through the Lithium Niobate substrate to port 3 represents a second waveguide 42.

A first directional coupler 43 is represented by the first location (with respect to the direction of the optical signal) at which the wave guides 41 and 42 come relatively close to each other. A second directional coupler 43 is represented by a second location (with respect to the direction of the optical signal) at which the waveguides 41 and 42 come relatively close to each other. The first directional coupler 43 splits each input received through ports 45 and 46 into two equal parts. The second directional coupler 44 recombines the light that was split apart by the first directional coupler 43. When no electric field is applied to the switch 32 (i.e., no pulse), each path 41 and 42 sees equal phase. In this case, all light received through port 45 is output through port 47. Likewise, all light received through port 46 is output through port 48 to the signal dump 51. Therefore, in this case, the incoming data signal at port 46 is dumped at signal dump 51 and the light that is in the optical fiber ring 31 continues to circulate around the ring, with a preselected percentage of the light being out-coupled at tap 52, as represented by arrow 53, which corresponds to the output of the optical retimer 30. Each time the light makes a round trip around the fiber ring 31, the optical amplifier 54 amplifies the optical signal to just compensate for the percentage of light out-coupled at tap 52. The optical amplifier is powered by pump 55, which may be laser in the event that the optical amplifier is an Erbium-doped fiber amplifier (EDFA), or a DC voltage supply in the event that the optical amplifier is a semiconductor optical amplifier (SOA). This is also true for the embodiment illustrated in FIG. 1.

When an electric field is applied to the switch 32 (i.e., when the pulse occurs), the two paths 41 and 42 have a relative phase of $\pi$. In this case, light input through port 45 (the current bit) is output through port 48 to the signal dump 51, and light received at port 42 (i.e., the next bit) is output through port 47 and fills the optical fiber ring 31. Therefore, the light from the previous bit is dumped and the light from the current bit enters the ring. The functions of the retimer 30 proceed in essentially the same manner described above with reference to FIG. 1 and the timing diagram of FIG. 2.

FIG. 4 is a block diagram of another example embodiment of the optical retimer of the present invention. In this case, the optical retimer 60 is comprised of free-space, bulk optical components. Because free-space, bulk optical components are being used, each of the optical paths would have some sort of mechanism, such as a set of lenses for keeping the optical beams collimated. However, for ease of illustration, the lenses that would be needed for this purpose are not shown. Those skilled in the art will understand how the optical pathways in the system shown in FIG. 4 could be collimated.

A small-percentage beam splitter 62 in the path of the incoming optical data signal causes a small percentage of the incoming optical signal to be diverted to the clock recovery component 61. The clock recovery component 61 then obtains the clock signal, which would be an electrical signal in this case, and delivers it to a high-powered pulsed laser 63. The laser 63 generates the optical pulses that control the switching operations of the retimer 60, as described below in more detail. When the high-powered laser generates a pulse that is focused on the Kerr medium 64, the refractive index of the Kerr medium 64 increases. When the pulse is gone, the refractive index of the Kerr medium 64 returns to normal. The increase in the refractive index of the Kerr medium 64 will add an additional phase of $\pi$ to the incoming signal on path 66. The beam splitter 65 sends 50% of the light along path 66 and 50% of the light along path 67. Paths 66 and 67 are optically equal in length and the two signals have the same phase modulo $2\pi$. Therefore, when the pulsed laser is not on, these two signals will interfere and recombine at 50/50 beam splitter 83 in such a way that all of the light coming from path 68 will be directed toward beam dump 71, and all of the light coming from path 91 will be directed toward the gain medium 77 along path 73.

However, when the pulsed laser 63 is on and focused on the Kerr medium 64, thereby providing the "pulse", a phase offset of $\pi$ is created in the branch 66 comprising the Kerr medium, which causes the 50/50 beam splitter 83 to direct all of the light coming from path 68 toward the gain medium 77 along path 73 and to direct all of the light coming from path 91 toward the beam dump 71. In essence, when the signals that travel along paths 66 and 67 are in phase, the 50/50 beam splitter 83 will cause all of the light coming from path 68, corresponding to port 2, to go to the beam dump 71, corresponding to port 3, and all of the light coming from path 91, corresponding to port 5, to go to path 73, corresponding to port 4. However, when the signals are out of phase when they reach the 50/50 beam splitter 83, all of the light coming from path 68, corresponding to port 2, will go to path 73, corresponding to port 4, and all of the light coming from path 91, corresponding to port 5, will go to the beam dump 71, corresponding to port 3. The light which is directed to path 73 is then amplified by gain medium 77 and 10% of the light passes through the beam splitter 74 to the output 75. The other 90% of the light propagates along path 72, and is reflected by mirror 86 towards mirror 81.

It is worth noting at this point that the location of the gain medium 77 or of the optical amplifiers discussed above with reference to FIGS. 1 and 3, with respect to the output of the optical retimer is not critical. For example, in the embodiment shown in FIG. 4, if the 10/90 beam splitter 74 was located before the gain medium 77 in the optical path, then the power of the output would be 90% of what it would have been if the beam splitter 74 is located after the gain medium 77. The same applies to the embodiments of FIGS. 1, 3 and 5. Since higher power is usually desirable, there is a good reason why one might prefer to locate the beam splitter 74, or whatever outcoupler is used, after the gain medium 77. However, it will be understood by those skilled in the art in view of the discussion provided herein that either approach is acceptable. There might be some reasons to put the output coupler before the gain medium. For example, since the gain medium may add noise to the signal, the signal-to-noise ratio of the output may be slightly better if the output coupler were before the gain medium.

During operation, when the laser 63 is off, light that comes from the input is split at beam splitter 65, recombines at beam splitter 83 and propagates into the beam dump 71. Light that is propagating along path 72 is reflected onto path 91 where it is split by the 50/50 beam splitter 65. That light then recombines at the 50/50 beam splitter 83 and is directed along path 73 toward the gain medium 77 where it is amplified. The gain medium 77 is powered by a laser pump 78. Of the amplified signal, 10% of the light is then out-coupled as the output 75 of the optical retimer 60 and the remaining 90% travels back around path 72 and returns to the gain medium 77, etc. When the laser is turned on, the light traveling along path 72 ends up being sent to the beam dump 71 and the incoming signal ends up on path 73 propagating toward the gain medium 77. This optical signal then circulates around the ring, with a portion being out-coupled with each round trip, until the end of the clock cycle, at which time it will be sent to the beam dump 71 and the new signal will enter the ring and be processed in the same manner.

FIG. 5 is a block diagram of another example embodiment of the present invention. This embodiment is similar to the fiber-coupled embodiment of FIG. 3 in that the switching action is performed by a Lithium Niobate switch. However, in accordance with this embodiment, instead of using an optical fiber to form the ring, optical waveguides and reflectors are embedded in the Lithium Niobate substrate. The components 101–107 shown in FIG. 5 may be identical to components 33–39 shown in FIG. 3. Therefore the functions of these components will not be reiterated in the discussion of the embodiment of FIG. 5.

The Lithium Niobate substrate has a gain-doped amplifier region 108. Preferably, the doping in this example would be with rare earth ions, such as Erbium, for example. By impregnating the Lithium Niobate substrate with a relatively high concentration of such ions, the region 108 is capable of acting as an amplifier, similar to an Erbium-Doped Fiber Amplifier (EDFA). The light from the pump laser 109 is coupled, via an optical fiber 110, into the waveguide 111. The doped region 108 creates gain in the sampled optical signal. The location at which the waveguide 111 comes very close to the main waveguide 112 is a directional coupler. This directional coupler is designed so that the wavelength of the sampled optical signal, which may be, for example, 1550 nanometers (nm), remains in the main waveguide 112, but the light of the wavelength of the pump laser 109, which may be, for example, 980 nm, is sufficiently different in wavelength from that of the sampled optical signal that light from the pump laser 109 is coupled into the main waveguide 112. Therefore, light from the pump laser 109 will be coupled into the main waveguide 112 and will overlap the sampled optical signal, thereby amplifying it.

Although some of the sampled optical signal will initially couple into waveguide 111, it will couple back into the main waveguide 112 after it passes the end of the waveguide 111. Therefore, at this point, all of the light (the sampled signal light and the light from the laser 109) will be in the main waveguide 112. However, because the pump laser 109 produces a different wavelength than that of the sampled optical signal, and because of the nature of light interference, at the location where the waveguide 113 is close to the main waveguide 112, which also corresponds to a directional coupler, the 980 nm light from the laser pump 109 will couple into waveguide 113 and will propagate out of the waveguide 113 and into the pump laser light dump 114. The amplified sampled signal light will remain in the main waveguide 112, but all of the light from the pump laser 109 will go to the optical dump 114.

The remainder of the operations of the optical retimer 100 shown in FIG. 5 are very similar to those of the fiber-coupled embodiment of FIG. 3. The optical fiber loop 31 of FIG. 3 is replaced in FIG. 5 by waveguides 112, 115 and 116 and the mirror facets 117 and 118. However, it should be noted that a looped waveguide formed in the chip could be used in an analogous manner to the loop formed by the optical fiber 31 in FIG. 3, the loop waveguide would need to have a radius that was large enough to prevent light from being coupled out of the waveguide, or the light would have to be amplified in some way to compensate for the loss due to the small bend ratio.

The switching action of the optical retimer 100 is provided by a 2-by-2 MachZehnder optical switch embedded in the LiNbO$_3$ substrate. The optical retimer 100 is logically identical to the optical retimers shown in FIGS. 1, 3 and 4. An optical tap 101 samples the incoming optical signal and the clock recovery component 102 then recovers the bit rate from the incoming data signal and delivers a clock signal to the electric pulse generator 103. The electric pulse generator 103 derives pulses from the recovered clock signal and switches an electric field off and on via positive and negative electrodes 104 and 105, which are connected to positive and negative contacts 106 and 107 embedded in or on the Lithium Niobate substrate. The line beginning at location 126 and continuing through the Lithium Niobate substrate to location 127 represents a first waveguide 123. The line 115 is a waveguide along which light reflected from mirror facet 118 propagates. The locations pointed to by arrows 121 and 122 represent first and second directional couplers, respectively.

The first directional coupler 121 splits light propagating along waveguides 115 and 123 into two equal parts. The second directional coupler 122 recombines the light that was split apart by the first directional coupler 121. When no electric field is applied (i.e., no pulse is generated by generator 103), each path 115 and 123 sees equal phase. In this case, all light propagating along waveguide 115 continues on to waveguide 116. Similarly, all input light propagating along waveguide 123 continues on to point 127 and is output to a signal dump 131. Therefore, in this case, the incoming optical data signal is dumped and the light that is propagating along waveguides 112, 115 and 116 continues to along these paths, with a preselected percentage of the light being split off at waveguide 135 as the output 136 of the optical retimer 100. Each time the light makes a round trip along waveguides 112, 115 and 116, the gain-doped amplifier region 108 amplifies the optical signal to just compensate for the percentage of light split off at waveguide 135. The output 136 corresponds to an optical fiber connected to the Lithium Niobate substrate.

When an electric field is applied (i.e., when the pulse occurs), the two paths 115 and 123 have a relative phase of $\pi$. In this case, light propagating along path 115 (the current bit) is coupled onto waveguide 123 and is output to the signal dump 131. Light received at port 126 (i.e., the next bit) is coupled onto waveguide 115 and propagates onto waveguide 116 and fills the optical path represented by waveguides 112, 115 and 116. The functions of the retimer 100 proceed in essentially the same manner, with a portion of the light being split off at waveguide 135 and the remainder being amplified on each round trip until the end of the clock cycle.

It should be noted that the present invention has been described in a variety of embodiments in order to demonstrate the many forms that the invention can take on, and to emphasize that the present invention is not limited to any particular configurations. For example, the discussion provided above demonstrates that the invention may be implemented in a fiber-coupled environment, in a bulk optics environment with free-space optical components, or in a fully-integrated environment. It should also be noted that the embodiments shown and described are only examples of the manners in which the invention can be implemented in these various environments. Those skilled in the art will understand, in view of the discussion provided herein, that many modifications can be made to the embodiments described herein that are within the scope of the invention.

What is claimed is:

1. An optical retimer for retiming an optical data signal, the optical retimer comprising:

an optical switch configured to allow light corresponding to a current bit to enter an optical pathway of the retimer at a specific point in time derived from the clock rate; wherein the optical switch has a first state in which, for a length of time corresponding to some fraction of a clock period, light corresponding to the current bit is allowed to propagate along the optical pathway and light corresponding to a next bit is dumped, and wherein the optical switch has a second state in which, for a length of time corresponding to the remainder of the clock period, light that corresponded to the current bit becomes light corresponding to a previous bit and is dumped and in which light that corresponded to the next bit becomes light that corresponds to the current bit and is allowed to propagate along the pathway for a next clock cycle during which a fraction of the light corresponding to the current bit is out-coupled from the retimer each time the light propagates around the optical pathway;

an optical out-coupler that causes a fraction of the light corresponding to the current bit to be out-coupled from the retimer each time the light propagates around the optical pathway; and an amplifier, the amplifier amplifying the light corresponding to the current bit to compensate for the light out-coupled from the retimer, the amplifier amplifying the light each time the light propagates around the optical pathway.

2. The optical retimer of claim 1, wherein the optical retimer further comprises a pulse generator for generating a pulse that causes the optical switch to switch from the first state to the second state for the duration of the pulse.

3. The optical retimer of claim 2, wherein the optical switch is a Lithium Niobate switch, and wherein the pulse is an electrical pulse.

4. The optical retimer of claim 1, wherein the optical retimer is in communication with a pulse generator for generating a pulse that causes the optical switch to switch from the first state to the second state for the duration of the pulse.

5. The optical retimer of claim 4, wherein the optical retimer is comprised of bulk optical elements and a Kerr medium, and wherein the pulse is an optical pulse generated by a laser focused on the Kerr medium.

6. The optical retimer of claim 4, wherein the optical switch is an electro-optic 2-by-2 optical crossbar switch, and wherein the pulse is an electrical pulse.

7. The optical retimer of claim 1, wherein the amplifier is a semiconductor optical amplifier (SOA).

8. The optical retimer of claim 1, wherein the amplifier is an Erbium-doped fiber amplifier.

9. The optical retimer of claim 1, wherein the optical pathway includes an optical fiber.

10. The optical retimer of claim 9, wherein the optical switch is a Lithium Niobate switch; and wherein the optical pathway includes optical waveguides formed in the Lithium Niobate switch.

11. The optical retimer of claim 1, wherein the optical switch is a Lithium Niobate switch, and wherein the Lithium Niobate switch, the optical out-coupler and the optical amplifier are embedded in a Lithium Niobate substrate.

12. A method for retiming an optical data signal transmitted over a network, the method comprising the steps of:
    providing an optical retimer;
    providing an optical switch;
    operating the optical switch to sample the optical data signal at a specific time and for a specific time duration during a clock cycle to obtain a current bit sample, the clock cycle corresponding to the rate at which the optical data signal is being transmitted;
    propagating the light corresponding to the current bit sample along an optical pathway of the retimer for a time period substantially equal to the clock cycle;
    out-coupling a fraction of the current bit sample of the optical signal from the retimer each time the light is circulated through the retimer;
    amplifying the light corresponding to the current bit sample as it is propagated along the optical pathway to ensure that the propagating light is at a power level substantially equal to a power level of the sampled optical data signal, and wherein once the light corresponding to the current bit sample has propagated along the optical pathway for said time period, the out-coupled light represents a retimed version of the sampled optical data signal;
    operating the optical switch to dump the light corresponding to said current bit sample at the end of said time period; and
    sampling the optical data signal at a specific time and for a specific time duration during a next clock cycle to obtain a next bit sample and repeating the propagating, out-coupling and sampling steps for the next bit sample.

13. The method of claim 12, wherein operating the optical switch to sample the optical data signal comprises a first state in which, for a length of time corresponding to some fraction of a clock period, light corresponding to the current bit is allowed to propagate along the optical pathway and light corresponding to a next bit is dumped, and wherein operating the optical switch to dump the light comprises a second state in which, for a length of time corresponding to the remainder of the clock period, light that corresponded to the current bit becomes light corresponding to a previous bit and is dumped and in which light that corresponded to the next bit becomes light that corresponds to the current bit and is allowed to propagate along the pathway for a next clock cycle during which a fraction of the light corresponding to the current bit is out-coupled from the retimer each time the light propagates around the optical pathway.

14. The method of claim 13, wherein the optical retimer comprises a pulse generator for generating a pulse that causes the optical switch to switch from the first state to the second state for the duration of the pulse.

15. The method of claim 14, wherein the optical switch is an electro-optic 2-by-2 optical crossbar switch, and wherein the pulse is an electrical pulse.

16. The method of claim 15, wherein the optical pathway includes optical waveguides formed in the optical switch that comprises a Lithium Niobate switch.

17. The method of claim 14, wherein the optical switch is a Lithium Niobate switch, and wherein the pulse is an electrical pulse.

18. The method of claim 13, wherein the optical retimer is in communication with a pulse generator for generating a pulse that causes the optical switch to switch from the first state to the second state for the duration of the pulse.

19. The method of claim 18, wherein the optical retimer is comprised of bulk optical elements and a Kerr medium, and wherein the pulse is an optical pulse generated by a laser focused on the Kerr medium.

20. The method of claim 13, wherein the optical retimer comprises a Lithium Niobate switch, an optical tap for performing the out-coupling step and an optical amplifier for performing the amplifying step, and wherein the Lithium Niobate switch, the optical out-coupler and the optical amplifier are embedded in a Lithium Niobate substrate.

21. The method of claim 12, wherein the optical pathway includes an optical fiber.

22. The method of claim 12, wherein the step of amplifying is performed by a semiconductor optical amplifier (SOA).

23. The method of claim 12, wherein the step of amplifying is accomplished by an Erbium-doped fiber amplifier.

* * * * *